(12) United States Patent
Cheng et al.

(10) Patent No.: US 8,458,327 B1
(45) Date of Patent: Jun. 4, 2013

(54) SYSTEM AND METHOD OF REDUCING NETWORK LATENCY

(75) Inventors: Yuchung Cheng, Sunnyvale, CA (US); Michael A. Belshe, Saratoga, CA (US); Roberto Javier Peon, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 12/836,905

(22) Filed: Jul. 15, 2010

(51) Int. Cl.
*G06F 15/173* (2006.01)

(52) U.S. Cl.
USPC ........... 709/224; 709/217; 709/223; 709/226; 709/230

(58) Field of Classification Search
USPC .................. 709/217, 223, 224, 226, 230
See application file for complete search history.

(56) References Cited

U.S. PATENT DOCUMENTS

| | | | | |
|---|---|---|---|---|
| 6,359,871 B1* | 3/2002 | Chung et al. | ................. | 370/338 |
| 2002/0150048 A1* | 10/2002 | Ha et al. | ....................... | 370/231 |
| 2007/0297414 A1* | 12/2007 | Gupta et al. | .............. | 370/395.4 |
| 2008/0259927 A1* | 10/2008 | Evans et al. | .................. | 370/394 |

OTHER PUBLICATIONS

Floyd, et al., Quick-Start for TCP and IP, RFC 4782, Jan. 2007, 77 pages.
J. Touch, TCP Control Block Interdependence, RFC 2140, Apr. 1997, 11 pages.

* cited by examiner

*Primary Examiner* — Liangche A Wang
(74) *Attorney, Agent, or Firm* — Lerner, David, Littenberg, Krumholz & Mentlik, LLP

(57) ABSTRACT

Aspects of the invention provide systems and methods for reducing latency in TCP connections. A client computer may send a request for information to a server computer using TCP. In response, the server may transmit the information to the client device according to default TCP connection assumptions. The server may re-configure the TCP connection based on various network statistics identified by the characteristics of the exchange between the server and the client. The server may periodically provide the network statistics concerning the speed of the network connection between the server and the client to the client. This information may be stored in cache memory by the client device for later use. For example, the next time the client device requests information from the server, the server may request the cached network statistics. The server may use this information to determine how information should be transmitted to the client.

18 Claims, 3 Drawing Sheets

SYSTEM AND METHOD OF REDUCING NETWORK LATENCY

BACKGROUND OF THE INVENTION

The Transmission Control Protocol ("TCP") is a communication protocol used to transmit streams of data between two computing systems, for example, a web server and a client computer. When the computing systems initiate a communication using TCP, even if the computers have communicated over the same network in the past, the computers do not have any information regarding the amount of traffic of the network. Thus, the web server typically assumes that the network is busy and sends information packets at a relatively slow rate. The web server may eventually adjust the speed at which information is sent during the connection. As a result, the network utilization rates for such TCP connections may be fairly low for shorter streams of data over high-speed networks. Thus, TCP may be considered inefficient in delivering data streams over high-speed networks, such as broadband networks.

To combat this problem, some computing systems may open up a fixed number of TCP connections to the same web server. However, the client computer still does not have any information about the speed of the network and thus the additional connections may again result in fairly low utilization rates. For example, some web browsing programs may open up 6 connections for a particular web server. This number may be too low for high-speed connections, or too high for lower-speed connections, such as dial-up, and again result in lower utilization rates.

BRIEF SUMMARY OF THE INVENTION

The present invention relates generally to reducing network latency. More specifically, the invention relates to using a priori information (e.g. previous network connection settings) to increase the speed at which information is initially sent using TCP.

One aspect of the invention provides a method for identifying network statistics for a TCP connection between two computers. The method includes receiving, at a first computer, a request for information; transmitting the requested information to a second computer using TCP; receiving acknowledgement information from the second computer; determining network statistics based on the acknowledgement information; and transmitting, by the first computer, the network statistics to the second computer to be stored for later use.

In one example, the network statistics include timestamp information. In another example, the method also includes receiving, from the second computer, information identifying a number of active TCP connections, and the network statistics are based on the number of active TCP connections. In another example, the network statistics include a TCP congestion window. In another example, the network statistics include information identifying a time period for information to travel over a network from the first computer to the second computer. In another example, the network statistics include information identifying a bandwidth of a network connection from the first computer to the second computer. In another example, the network statistics include information identifying a retransmission rate of a network connection from the first computer to the second computer. In another example, the network statistics include information identifying a reordering degree of an upstream network connection from the first computer to the second computer. In another example, the method also includes receiving the network statistics previously transmitted by the first computer from the second computer. In another example, determining network statistics and transmitting the network statistics to the second computer are performed periodically.

Another aspect of the invention provides a computer for identifying network statistics for a TCP connection between the computer and a second computer of a network. The computer includes a processor. The processor is configured to receive a request for information from the second computer; transmit the requested information to the second computer using TCP; receive acknowledgement information from the second computer; determine network statistics based on the acknowledgement information; and transmit the network statistics to the second computer to be stored for later use.

In one example, the processor is also configured to receive, from the second computer, the network statistics previously transmitted to the second computer. In another example, the processor is also configured to determine the network statistics and transmit the network statistics to the second computer periodically. In another example, the processor is also configured to receive a number of concurrent active flows from the second computer. In another example, the processor is also configured to receive estimated available bandwidth information from the second computer. In another example, the processor is also configured to receive additional network information, including a number of TCP connections between the second computer and the computer, from the second computer, and the determined network statistics are further based on the additional network information.

Another aspect of the invention provides a client computer for identifying network statistics for a TCP connection between the client computer and a server computer of a network. The client computer includes memory and a processor operatively coupled to the memory. The processor is configured to transmit a request for information to the server computer; receive the requested information from the server computer via the TCP connection; transmit acknowledgement information; receive network statistics generated by the server computer based on the acknowledgement information; store the received network statistics in the memory; and transmit the stored network statistics to the server computer.

In one example, the processor is also configured to transmit additional network information, including a number of TCP connections between the client computer and the server computer, wherein the received network statistics are further based on the additional network information. In another example, the network statistics include information identifying a time period for information to travel over the network from the client computer to the server computer. In another example, the network statistics include information identifying a bandwidth of a network connection from the client computer to the server computer.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

Figure 1:
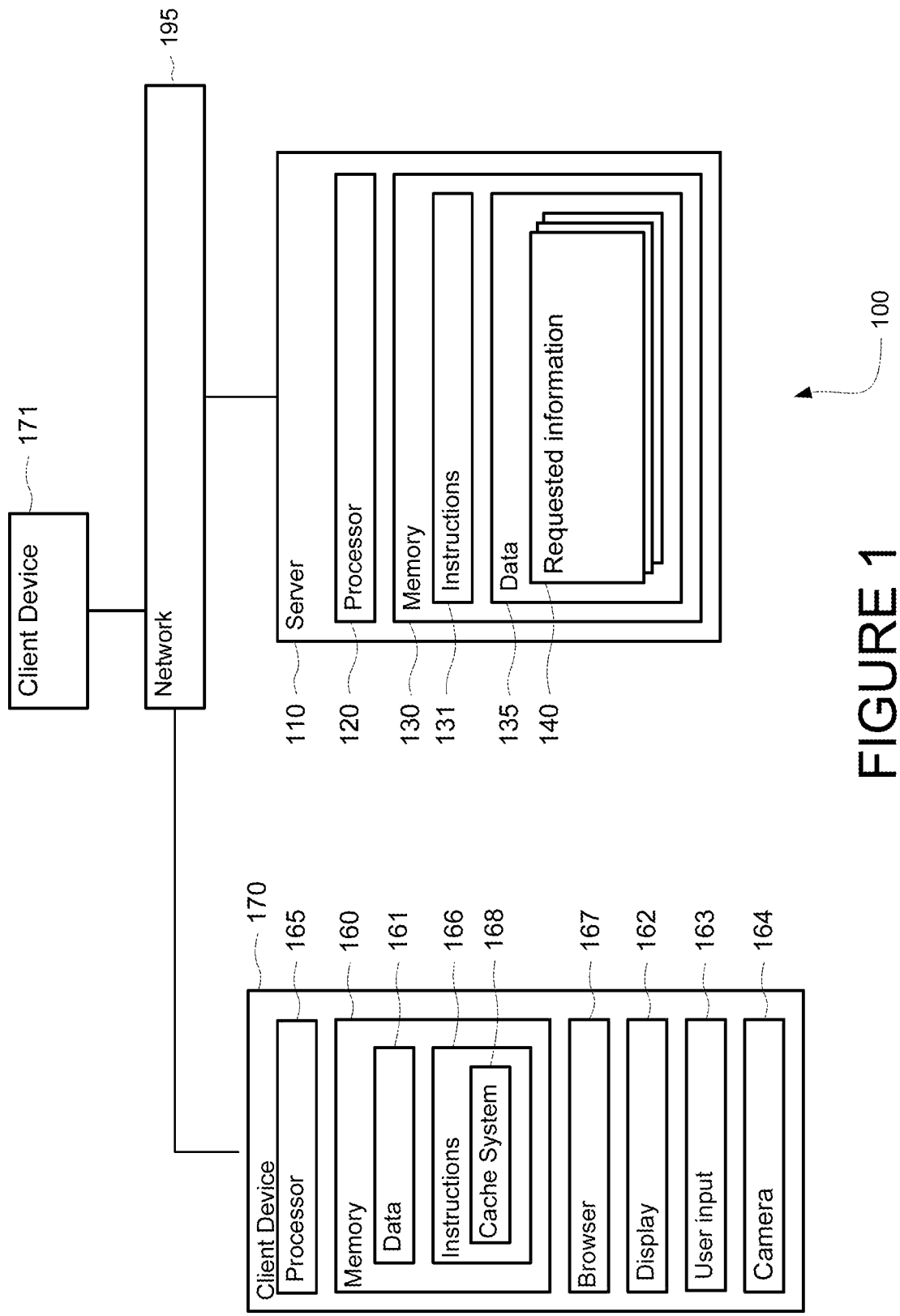
FIG. 1 is a functional diagram of a system in accordance with an aspect of the invention.
Figure 2:
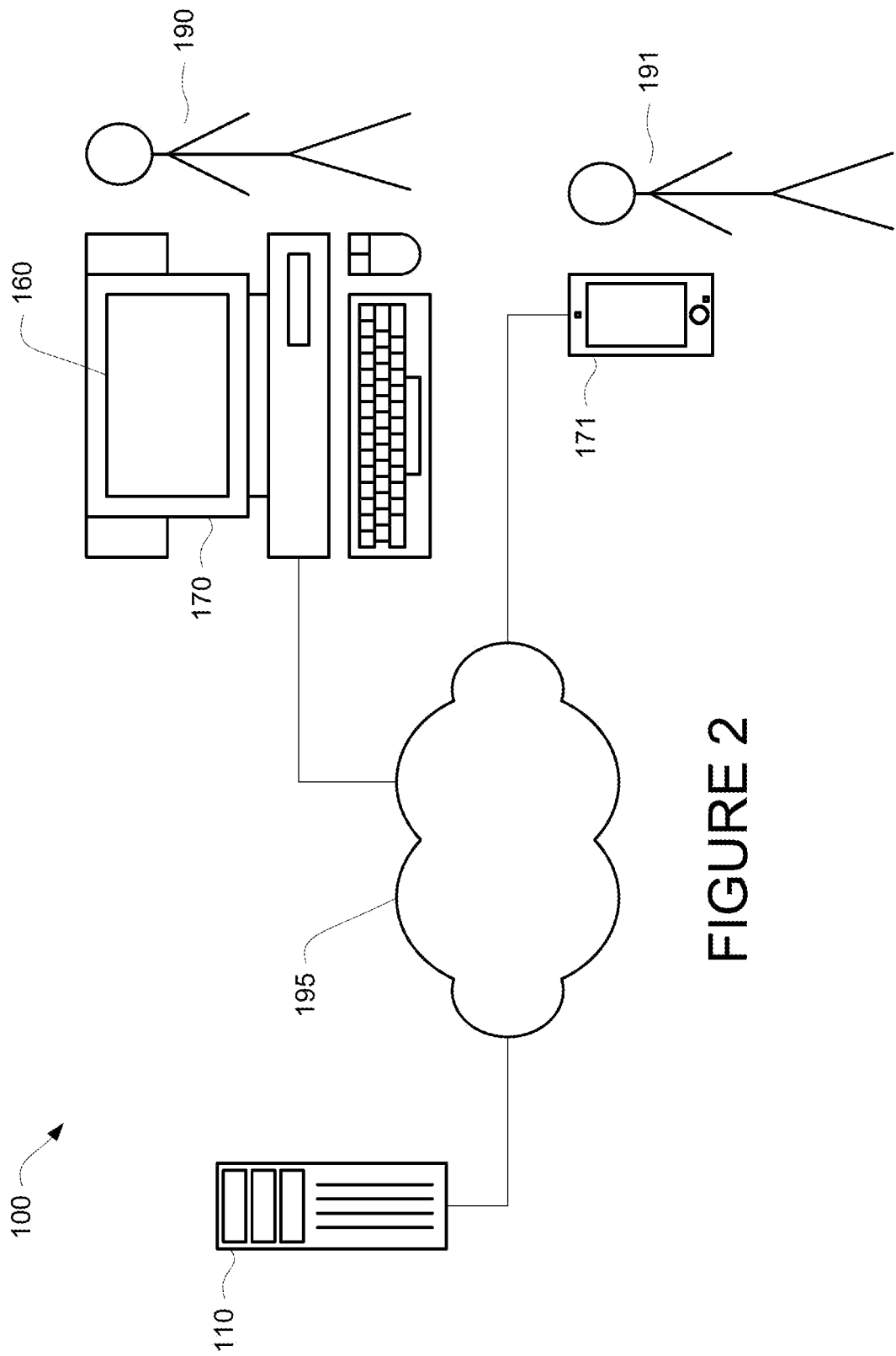
FIG. 2 is a pictorial diagram of a system in accordance with an aspect of the invention.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. Memory also includes data 135 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or Advanced Micro Devices. Alternatively, the processor may be a dedicated controller such as an ASIC.

The instructions 131 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display 162 of client device 170. Server 110 may also comprise a plurality of computers, e.g. a load balanced server farm, that exchange information with different nodes of a network for the purpose of receiving, processing and transmitting data to the client devices; in this instance, the client devices will typically still be at different nodes of the network than any of the computers comprising server 110.

Each client device may be configured similarly to the server 110, with a processor 165, memory 160 and instructions 167. Each client computer 170-71 may be a personal computer, intended for use by a person 190-91, having all the internal components normally found in a personal computer such as a central processing unit (CPU), display device 162 (for example, a monitor having a screen, a projector, a touch-screen, a small LCD screen, a television, or another device such as an electrical device that is operable to display information processed by the processor), CD-ROM, hard-drive, user input 163 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 170-71 may comprise a full-sized personal computer, the system and method may also be used in connection with mobile devices capable of wirelessly exchanging data with a server over a network such as the Internet. For example, client computer 170 may be a wireless-enabled PDA such as a Blackberry phone or an Internet-capable cellular phone. In either regard, the user may input information using a small keyboard (in the case of a Blackberry phone), a keypad (in the case of a typical cell phone), a touch screen (in the case of a PDA), a camera 164, or any other means of user input.

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a server and others on a client, various aspects of the system and method may be implemented by a single computer having a single processor.

Data 135 may include requested information 140. Requested information may identify various types of information which the server may transmit to client devices in response to a request for information. For example, a request for information may include a request for access to a web page or other information such as email. It will be understood that the request may be any data communication between a client and server.

Client device 170 may include a client cache system 168. For example, the client cache system may be used by the client's web browser 167 to manage files requested and received from a server computer. As will be described in more detail below, the client cache system may access cache memory for storage of various files. It will be appreciated that although the cache memory is described at being accessible by a client device, it will be understood that there may be any number of intermediary caches on the network between the sever and the client, as well as at cache memory accessible by the server. These additional cache systems may work independently of the invention.

Figure 3:
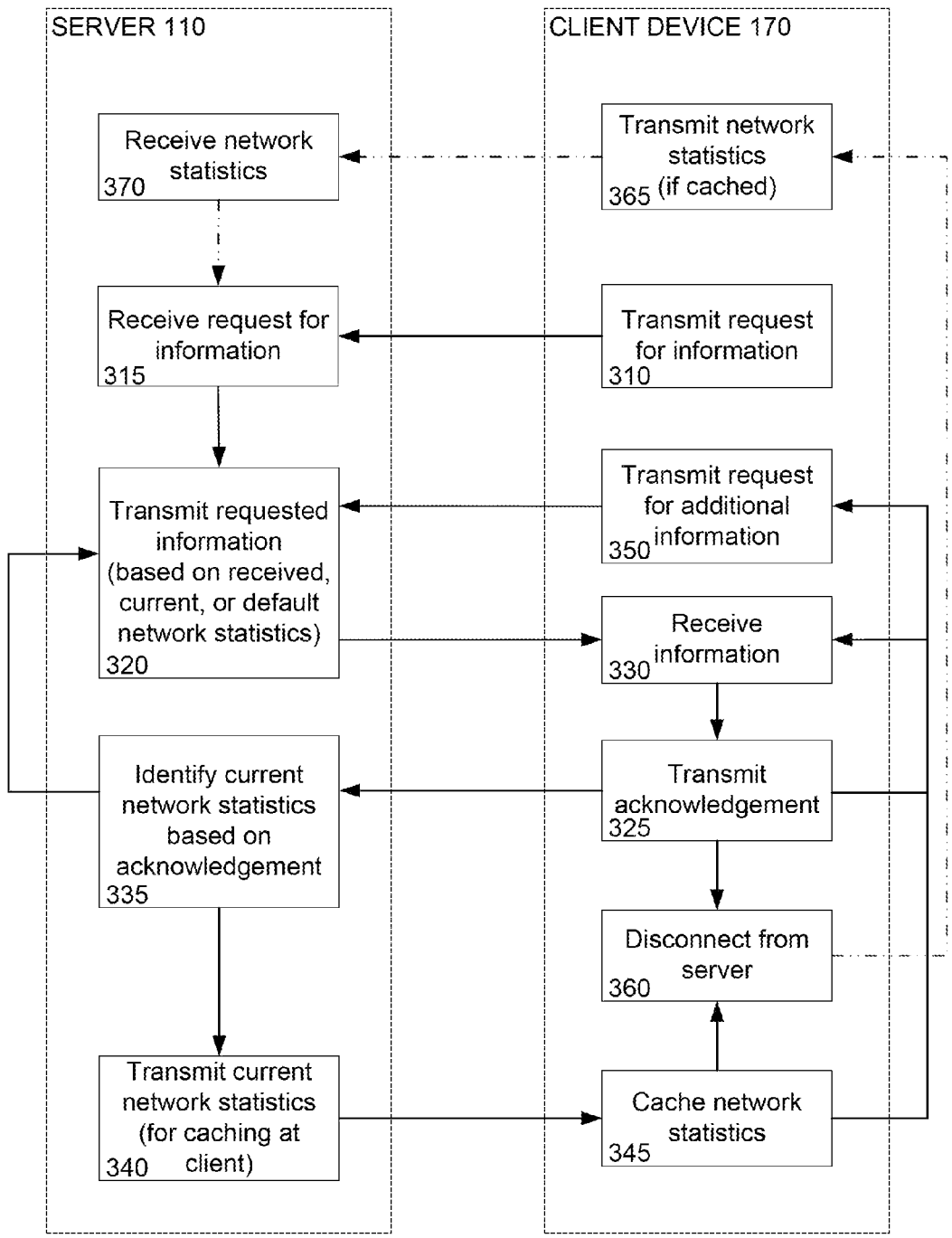
FIG. 3 is a flow diagram in accordance with aspects of the invention.

FIG. 3 an embodiment which will be described in detail below. It will be understood that operations do not have to be performed in the precise order described. Rather, various steps can be handled in a different order or simultaneously.

A client device may establish a TCP connection and transmit a request for information to a server computer over a network. For example, as shown in blocks 310 and 315 of FIG. 3, client device 170, may transmit a request for information to server 110. Server 110 may determine that the information sent between client device 170 and the server is being transmitted according to TCP.

The server may transmit the requested information based on network statistics. Network statistics may include, for example, timestamps, the number of active TCP connections, a TCP congestion window, round trip time (the time it takes for information to travel from the server to the client and back to the server), downstream (the communication channel from the server to the client) and upstream (the communication channel from the client to the server) bandwidth, downstream and upstream retransmission rate, downstream and upstream reordering degrees, etc. The reordering degree measures how wide the network can reorder packets of information. For example, if the server sends packets 1-2-3-4-5, and the client receives 5-4-3-2-1, the reordering degree is 5. TCP tolerates a reordering degree of 3. Beyond 3, TCP performance degrades significantly.

As shown in block 320, server 110 may initially transmit the requested information based on some version of network statistics: default, received or current. For example, if server 110 has not received network statistics from client device 170, the server may initially use TCP default settings. TCP connections always start with default network parameters. For example, currently, all TCP connections begin with a congestion window of 4k (3 packets), dupack threshold of 3, and retransmission timeout of 3 seconds. If server 110 does receive network statistics from client device 170, for example, because they were previously stored by the client device, the server may initially transmit the requested information based on the network statistics received from the client device as explained below.

During the connection with the server, the client device may transmit various information to the server. For example, the client device may receive the information as shown in block 325. Based on when and what information has been received, the client device may generate acknowledgement information (or acknowledgment packets) which are transmitted to server 110, as shown in block 330. The client may also identify network statistics, such as the number of TCP connections between the client and server and transmit this information to the server during the connection. The client may also provide network information of the client system beyond the current TCP connection. For example, the client may also transmit to the server the number of concurrent active flows (flow actively transmitting and/or receiving data) and the estimated available bandwidth. The information contained in the acknowledgement packets as well as other network statistics may be transmitted to the server periodically, for example the client may update the server every 30 seconds about its perception of the network. Upon receipt, the updated information may be used by the server to identify the current network statistics as shown in block 335.

Once the server has identified the current network statistics, the server may use this information in various ways. For example, returning to block 320, the current network statistics may be utilized by server 110 when transmitting information to set various values related to the TCP connection as described above. As shown in blocks 340 and 370, server 110 may periodically transmit the current network statistics to client device 170 to be stored in cache memory for later use, for example to be sent to server 110 when requested.

After the network statistics are stored at the client device and/or an acknowledgement has been transmitted, the client device may continue to receive and/or request additional information, as shown in blocks 325 and 350. When the client has received the requested information, and no more information has been requested, the client device may disconnect from the server as shown in block 360.

The next time that the client device requests information from the server, the client device will be able to retrieve the cached network statistics and transmit them to the server. Instructions at the client device may be used to retrieve the cached network statistics and transmit them to the server automatically each time the client device connects to a server. For example, as shown in block 365, the client device may automatically transmit the cached network statistics before, or in some cases after, the initial request for information is made. Upon receipt of the cached network statistics at block 370, the server may then utilize the received network statistics in order to transmit any additional information.

Transmitting information based on the received or current network statistics may include, for example, adjusting the TCP congestion window, duplicate acknowledgement thresholds which control when there are no network reorderings and it is time to retransmit lost information packets, and retransmission timers. Using this information to initially configure these TCP connection values may allow the server to optimize the loss recover process and also utilize a greater amount of bandwidth in high-speed connections much faster than initially utilizing the default and slowly adjusting the values based on information identified during the connection.

In one embodiment, the network statistics may be incorporated into other information transmitted to the server. TCP network statistics may be included in the semantics for other protocols, such as in the HTTP protocol or other application protocols on top of TCP. For example, the network statistics may be included in the HTTP headers such as: NETWORDSTATS: CWND=20pkts, RTT=30 ms, BANDWIDTH=1 Mbps, etc. In another example, the network statistics may be incorporated into the TCP layer such as TCP options.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method for identifying network statistics for a TCP connection between two computers, the method comprising:
   receiving, at a first computer, a first request for information;
   transmitting the requested information to a second computer using TCP;
   receiving acknowledgement information from the second computer;
   determining network statistics based on the acknowledgement information;
   transmitting, by the first computer, the network statistics to the second computer to be stored for later use;
   receiving, at the first computer, the stored network statistics from the second computer with a subsequent request for information;
   using the received network statistics to transmit additional information; and
   using the additional information to set TCP connection values.

2. The method of claim 1, wherein the network statistics include timestamp information.

3. The method of claim 1, further comprising receiving, from the second computer, information identifying a number of active TCP connections, wherein the network statistics are based on the number of active TCP connections.

4. The method of claim 1, wherein the network statistics include a TCP congestion window.

5. The method of claim 1, wherein the network statistics include information identifying a time period for information to travel over a network from the first computer to the second computer.

6. The method of claim 1, wherein the network statistics include information identifying a bandwidth of a network connection from the first computer to the second computer.

7. The method of claim 1, wherein the network statistics include information identifying a retransmission rate of a network connection from the first computer to the second computer.

8. The method of claim 1, wherein the network statistics include information identifying a reordering degree of an upstream network connection from the first computer to the second computer.

9. The method of claim 1, wherein determining network statistics and transmitting the network statistics to the second computer are performed periodically.

10. A computer for identifying network statistics for a TCP connection between the computer and a second computer of a network, the computer comprising:
    a processor configured to:
    receive a request for information from the second computer;
    transmit the requested information to the second computer using TCP;
    receive acknowledgement information from the second computer;
    determine network statistics based on the acknowledgement information;
    transmit the network statistics to the second computer to be stored for later use;
    receive the stored network statistics from the second computer with a subsequent request for information;
    use the received network statistics to transmit additional information; and
    use the additional information to set TCP connection values.

11. The computer of claim 10, wherein the processor is further configured to determine the network statistics and transmit the network statistics to the second computer periodically.

12. The computer of claim 10, wherein the processor is further configured to receive a number of concurrent active flows from the second computer.

13. The computer of claim 10, wherein the processor is further configured to receive estimated available bandwidth information from the second computer.

14. The computer of claim 10, wherein the processor is further configured to receive additional network information, including a number of TCP connections between the second computer and the computer, from the second computer, wherein the determined network statistics are further based on the additional network information.

15. A client computer for identifying network statistics for a TCP connection between the client computer and a server computer of a network, the client computer comprising:
    memory; and
    a processor operatively coupled to the memory, the processor being configured to:
    transmit a request for information to the server computer;
    receive the requested information from the server computer via the TCP connection;
    transmit acknowledgement information;
    receive network statistics generated by the server computer based on the acknowledgement information;
    store the received network statistics in the memory; and
    transmit, with a subsequent request for information, the stored network statistics to the server computer for use in transmitting additional information and setting TCP connection values.

16. The client computer of claim 15, wherein the processor is further configured to transmit additional network information, including a number of TCP connections between the client computer and the server computer, wherein the received network statistics are further based on the additional network information.

17. The method of claim 1, wherein the network statistics include information identifying a time period for information to travel over the network from the client computer to the server computer.

18. The method of claim 1, wherein the network statistics include information identifying a bandwidth of a network connection from the client computer to the server computer.

* * * * *